United States Patent [19]

Nakajima

[11] 4,274,724
[45] Jun. 23, 1981

[54] INDICATOR CIRCUIT FOR AUTO-STROBO UNIT

[75] Inventor: Yukio Nakajima, Hachioji, Japan

[73] Assignee: Olympus Optical Company Ltd., Tokyo, Japan

[21] Appl. No.: 21,161

[22] Filed: Mar. 16, 1979

[30] Foreign Application Priority Data

May 25, 1978 [JP] Japan .................................. 53/62566

[51] Int. Cl.³ .......................... G03B 15/05; H01J 7/42; H05B 37/03; H05B 41/32
[52] U.S. Cl. ...................................... 354/33; 354/128; 315/136; 315/241 P
[58] Field of Search ..................................... 354/32–35, 354/60 E, 60 A, 60 L, 53, 127, 128, 145; 315/241 P, 135, 136, 151

[56] References Cited

U.S. PATENT DOCUMENTS

| | | |
|---|---|---|
| 3,878,429 | 4/1975 | Iwata ..................................... 315/151 |
| 3,979,639 | 9/1976 | Adams, Jr. ......................... 315/241 P |
| 3,993,929 | 11/1976 | Dick et al. ......................... 315/241 P |
| 3,999,193 | 12/1976 | Hasegawa ......................... 354/128 X |
| 4,047,194 | 9/1977 | Nakamura et al. ............... 354/145 X |
| 4,099,100 | 7/1978 | Takahata ........................... 315/241 P |
| 4,163,924 | 8/1979 | Hasegawa ......................... 354/127 X |

Primary Examiner—L. T. Hix
Assistant Examiner—William B. Perkey
Attorney, Agent, or Firm—Weinstein & Sutton

[57] ABSTRACT

An indicator circuit for an auto-strobo unit comprises a switching element which rapidly discharges a capacitor which, when adequately charged, feeds a display element indicating proper operation of the auto-strobo unit. The switching element is turned on in synchronized relationship with the initiation of a flashlight illumination from a flash discharge tube to discharge any remaining charge on the capacitor, thus providing a reliable indication of each flashlight illumination of the flash discharge tube.

11 Claims, 4 Drawing Figures

INDICATOR CIRCUIT FOR AUTO-STROBO UNIT

BACKGROUND OF THE INVENTION

The invention relates to an indicator circuit for providing an indication of the operation of an auto-strobo unit, and more particularly, to an improved indicator circuit which indicates whether a flash discharge tube has automatically operated to provide a proper amount of flashlight illumination in response to the closure of synchro contacts provided on the part of a camera.

An indicator which indicates the operation of an auto-strobo unit generally comprises a capacitor which is charged by a portion of the discharge current from a main capacitor connected in the discharge circuit of the strobo unit and which discharges through a neon discharge tube representing an indicator tube. However, once charged, it requires a finite length of time, which may be on the order of three seconds, for example, for the charge on the capacitor to be discharged through the neon discharge tube to extinguish its illumination. Hence, if pictures are taken in rapid succession using the flashlight illumination, the indicator charging capacitor becomes charged anew before it is completely discharged, producing a continued display. This presents no problem whatsoever so long as the illumination produced by the strobo unit is sufficient to assure a proper photographing operation. However, in the event the main capacitor is insufficiently charged to provide a full exposure by the emission of the flashlight or to cause such emission at the time the synchro contacts are closed in response to a shutter release, the neon discharge tube is energized by the discharge current from the associated capacitor which remains charged from the previous strobo operation despite the fact that the exposure level decision circuit of the strobo unit does not produce a full exposure signal. This results in a misleading recognition on the part of the user in that he assumes that a proper exposure has occurred by seeing the illumination of the neon discharge tube when the film is subject to an under-exposure, which is revealed only upon developing the film.

Before proceeding with the description of the invention, the above disadvantage will be described more fully with reference to FIG. 1 which shows a conventional indicator circuit associated with an automatically controlled strobo unit. In FIG. 1, there is shown a high voltage source 1 across which a main capacitor 2 is connected in series with diode 10. A discharge illumination circuit including trigger transformer 3 as well as a series combination of flash discharge tube 4 and main switching element 5 is connected across the capacitor. Connected across the main switching element 5 are a commutation circuit including capacitor 6 and switching element 7 as well as an indicator circuit including capacitor 8 and display element 9.

Specifically, the capacitor 2 has its positive electrode connected with the cathode of the diode 10, with the junction therebetween being connected with a positive bus L. A negative bus $E_O$ is connected with the negative terminal of the capacitor 2. The trigger transformer 3 includes a primary coil 3a which is connected through trigger capacitor 12 and resistor 11 with the bus L, and also includes a secondary coil 3b which has its one end connected with the trigger electrode 4a of the flash discharge tube 4. Synchro contacts 13 are connected in shunt with the series combination of trigger capacitor 12 and primary coil 3a, and are adapted to be closed in response to a shutter release operation of a camera. Both the primary and secondary coils 3a, 3b are connected together at junction a, which is connected with the gate of the main switching element 5, comprising a thyristor, through resistor 14.

The main switching element 5 is connected in series with the flash discharge tube 4 and with a parallel combination of coil 15 and diode 16 across the main capacitor 2, and has its gate connected with the bus $E_O$ through resistor 17. The series combination of the tube 4 and main switching element 5 is shunted by a series circuit including resistor 18 and commutating switching element 7 which is a thyristor. The gate of the element 7 is connected with the bus $E_O$ through resistor 20, and is adapted to receive an exposure complete signal from an exposure level decision circuit 19 of known form which may include a photometric circuit.

The commutating capacitor 6 is connected between the anode of the main switching element 5 and that of the commutating switching element 7. A series combination of diode 21 and indicator operating capacitor 8 is connected in shunt with the main switching element 5. The display element 9 and capacitor 23 are connected in shunt with the capacitor 8 through resistor 22. A resistor 24 is connected in shunt with the main switching element 5, and normally cooperates with resistor 18 to charge the commutating capacitor 6 to the polarity shown in circles, its electrode which is connected with the switching element 7 being charged to the positive polarity.

In operation, when a shutter release of a camera is actuated to close the synchro contacts 13 to provide a flashlight photographing operation assuming that the main capacitor 2 is sufficiently charged, the combination of the trigger capacitor 12 and trigger transformer 3 triggers both the flash discharge tube 4 and main switching element 5, whereby the charge on the main capacitor 2 discharges through both of these elements, thus producing a synchronized flashlight illumination. When a proper amount of exposure has been given, the exposure level decision block 19 including a photometric circuit is activated to provide an exposure complete signal which is applied to the gate of the commutating switching element 7. Thereupon, the element 7 is turned on, whereby the commutating capacitor 6 discharges through the switching elements 5 and 7, thus passing a reverse current flow through the main switching element 5 to turn it off. A discharge current continues to flow through the flash discharge tube 4 after the element 5 is turned off, the discharge current passing through the tube 4, commutating capacitor 6 and commutating switching element 7 to charge the capacitor 6 to the opposite polarity from that shown in circles. It will then be noted that though the electrode of the capacitor 6 connected with the resistor 24 momentarily assumes a negative potential relative to the bus $E_O$ at the time the element 7 is turned on, it immediately reverts to a positive polarity. As the discharge current passing through the tube 4 gradually decreases and becomes less than a holding current, the tube 4 completely ceases to illuminate, thus completing an automatic illumination operation which provided a proper exposure. When the electrode of the capacitor 6 connected with resistor 24 reverts to a positive potential, the diode 21 is forwardly biased to conduct part of the discharge current passing through the tube 4, thus charging the capacitor 8. As the capacitor 8 is charged, it begins to charge capacitor 23 through resistor 22. When the voltage across the capacitor 23 reaches the threshold voltage of the display element 9 which may, for example, be a neon discharge tube, the charge on the capacitor 23 discharges through the element 9, thus illuminating it to provide an indication that a proper exposure has been given.

It is to be understood that the neon discharge tube which is used as the display element 9 has a hysteresis phenomenon, so that the element 9 continues to illuminate until the voltage across the capacitor 23 decreases below an extinction voltage of the element 9. After extinction of the element 9, the capacitor 23 begins to charge again through resistor 22 until the voltage thereacross reaches the threshold voltage of the element 9, whereupon the latter is again illuminated. The indicator circuit comprising capacitors 8, 23, resistor 22 and element 9 repeats such operation, and hence the display element 9 continues its flashing operation with a suitable time constant until the voltage across the capacitor 8 reduces below the threshold voltage of the element 9. When the strobo unit operates to provide a flashlight illumination and to charge the capacitor 8, the indicator circuit effects a flashing operation for a given time interval independently from a subsequent operation of the strobo unit. This display is designed to continue for a time interval on the order of three to five seconds in order to permit a user to recognize the operation of the strobo unit when he moves his eyes from the viewfinder after he has actuated a shutter release while viewing the viewfinder of a camera.

However, it is to be noted that if the indicator circuit effects a flashing operation in the event the main capacitor 2 is insufficiently charged to provide a proper exposure or to activate the flash discharge tube 4 when pictures are taken in rapid succession using the flashlight illumination, as in an automatic continuous photographing operation using a motor drive, the user is misled that a proper exposure has been given inasmuch as the indicator circuit fails to indicate an underexposure.

SUMMARY OF THE INVENTION

It is an object of the invention to provide an indicator circuit for an auto-strobo unit which avoids the described disadvantage of the conventional arrangement, by the addition of a circuit of simplified design.

In accordance with the invention, there is provided means which discharges any remaining charge on the indicator energizing capacitor at the same time as the flash discharge tube is illuminated for the next time. This assures a reliable indication of whether each flashlight illumination produced by the strobo unit is of a proper level. Thus, reliable information is given to a user each time the strobo unit is operated to indicate whether the flashlight illumination has been of a proper level.

DESCRIPTION OF PREFERRED EMBODIMENTS

Figure 1:
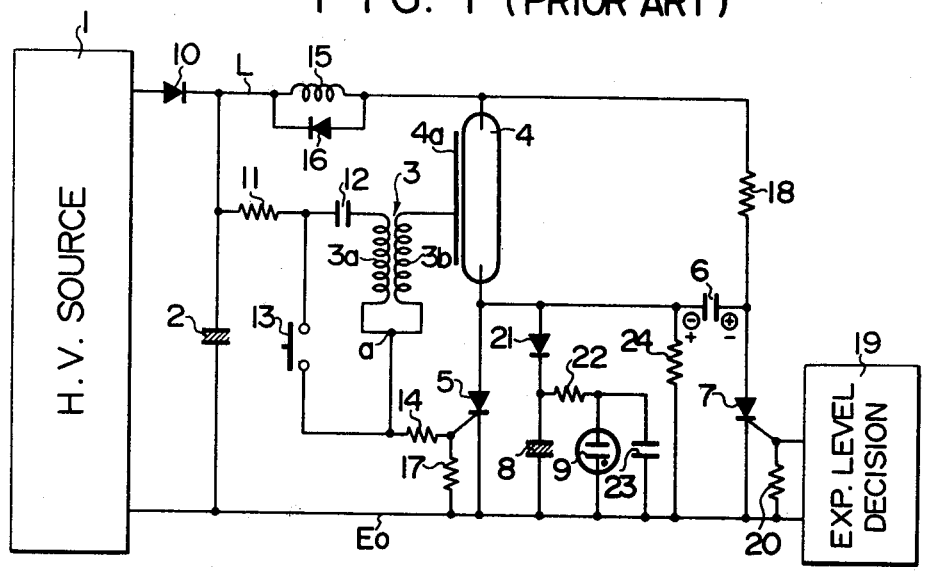
FIG. 1 is a circuit diagram of a conventional indicator circuit for auto-strobo unit.
Figure 2:
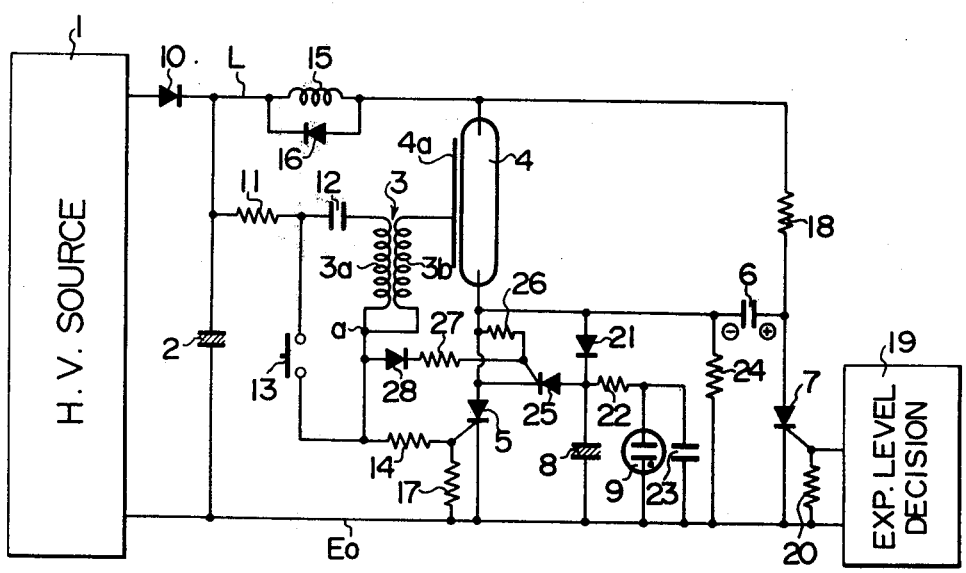
FIG. 2 is a circuit diagram of the indicator circuit according to one embodiment of the invention.

Referring to FIG. 2, there is shown an indicator circuit according to one embodiment of the invention. The circuit arrangement is generally similar to that shown in FIG. 1 except for the provision of a switching element 25 which is preferably a thyristor, resistors 26, 27 and diode 28. Elements corresponding to those shown in FIG. 1 are designated by like numerals and will not be described again for purposes of simplicity.

The switching element 25 has its anode connected with the junction between diode 21 and capacitor 8, and its cathode connected with the anode of the main switching element 5. The gate of the element 25 is connected to receive a firing voltage from resistor 26 and from a series combination of diode 28 and resistor 27. The resistor 26 has its one end connected with the gate of element 25 and its other end connected with the anode of the switching element 5. The resistor 27 has its one end connected with the gate of element 25 and its other end connected with the cathode of diode 28, the anode of which is connected with the junction a between the primary and secondary coils 3a, 3b.

In operation, the flash discharge tube 4 is energized to provide a flashlight illumination and is turned off in the same manner as mentioned above. In response to the energization of the tube 4, capacitor 8 is charged to cause a flashing operation of the display element 9.

If the synchro contacts 13 are closed again while the capacitor 8 remains charged, the switching element 25 is turned on as the main switching element 5 is turned on again, thus rapidly discharging the capacitor 8 through the element 25 and main switching element 5. Thus, the flashing operation of the neon discharge tube 9 is at once interrupted.

If the main capacitor 2 is sufficiently charged to energize the tube 4, the latter produces a flashlight illumination as the main switching element 5 is turned on. However, if the main capacitor 2 is charged insufficiently to cause an illumination of the tube 4, there occurs no flashing operation of the display element 9 since the capacitor 8 remains discharged.

In case the flash discharge tube 4 is energized to illuminate, but the main capacitor 2 has a voltage which is insufficient to provide a given amount of the exposure, the switching element 7 is not triggered. Consequently, the main switching element 5 is not turned off until the discharge tube 4 ceases to conduct. When the voltage across the main capacitor 2 reduces to the extinction level of the discharge tube 4, the latter is turned off, but the voltage on the electrode of the commutating capacitor 6 connected with the resistor 24 remains low to prevent the capacitor 8 from being charged, thus inhibiting the flashing operation of the display element 9.

When the tube 4 is energized to illuminate and the main capacitor 2 has a sufficient voltage thereacross to provide a proper amount of exposure, the capacitor 8 is charged by a portion of the discharge current flowing through tube 4, thus allowing a flashing operation of the display element 9 to be initiated. At this time, a reverse voltage is applied across the anode and cathode of the switching element 25 to turn it off, so that the accumulated charge on the capacitor 8 cannot find its way through this element 25.

Figure 3:
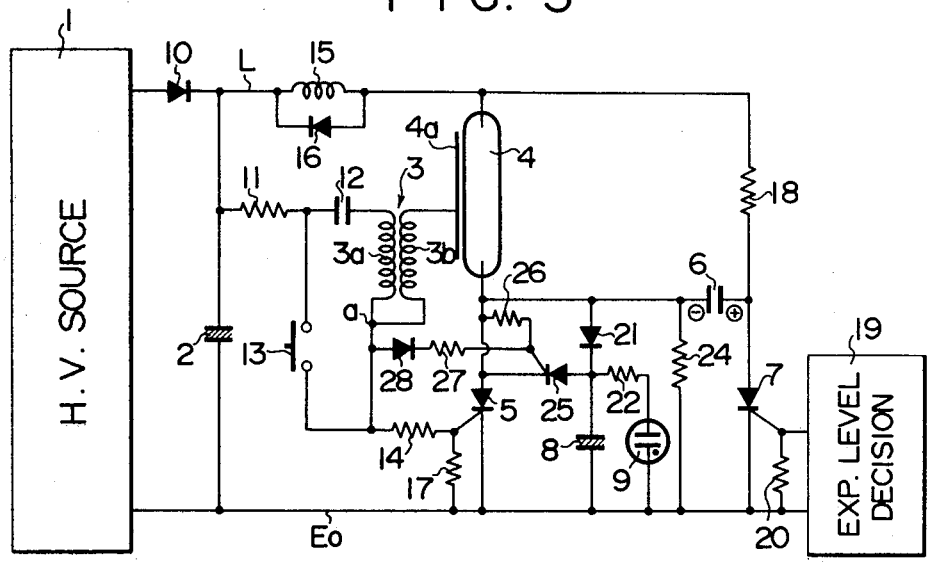
FIGS. 3 and 4 are circuit diagrams illustrating other embodiments of the invention.

FIG. 3 shows a modification of the embodiment shown in FIG. 2 from which the capacitor 23 is eliminated. In other respects, the arrangement and operation are similar to that shown and described with reference to FIG. 2. In this instance, the element 9 is directly fed from the capacitor 8, and hence provides a continuous illumination rather than a flashing illumination. Again, the continuous illumination by the element 9 is interrupted in the event of an insufficiently charged main capacitor 2 or an under-exposure provided by the tube 4.

Figure 4:
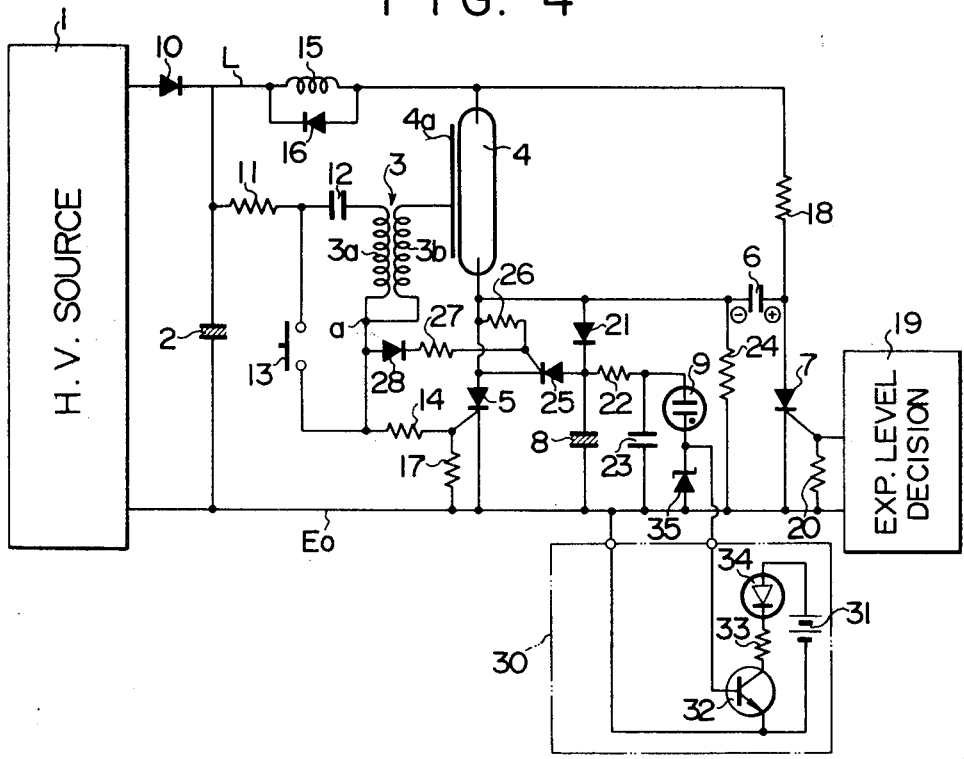

FIG. 4 shows a further embodiment of the invention. In previous embodiments, the display element 9 is mounted to be exposed through the rear surface of the strobo unit, for example, to indicate the operation thereof. However, in the present embodiment, an additional display is provided within the viewfinder of the camera by a light emitting element such as light emitting diode. Specifically, in FIG. 4, a block 30 indicated by phantom line represents a camera internally housing a source battery 31. A series combination including a switching transistor 32, resistor 33 and light emitting element 34 such as a light emitting diode is connected across the battery 31. The element 34 is located within the viewfinder, and the base of the transistor 32 is fed from the junction between the display element 9 within the strobo unit and a constant voltage diode 35 which is provided for the purpose of protection. The emitter of transistor 32 is connected with the bus $E_O$.

The discharge illumination circuit as well as the indicator circuit which indicates the operation thereof are constructed in the same manner as the embodiment shown in FIG. 2, hence the description of their arrangement and operation will be omitted, by using like numerals for corresponding parts. It will be understood that the switching element 25 is not limited to a thyristor, but may comprise any other switching element such as a transistor.

What is claimed is:

1. In an electronic flash unit including:
    a flash discharge tube;
    first normally-off switch means coupled to said flash discharge tube for completing a discharge path through said flash discharge tube when turned on;
    trigger means for turning on said first switch means to operate said electronic flash unit, thus providing a flashlight illumination;
    exposure level control means for receiving the reflected light from a subject during the operation of the flashlight illumination of said flash discharge tube for operating said first switch means to the off condition when the amount of flashlight illumination of said flash discharge tube reaches a predetermined exposure level;
    a capacitor being selectively charged by a current from said flash discharge tube when said first switch means is turned off;
    indicator means being directly connected to said capacitor for selective operation by the charge developed across said capacitor;
    the improvement comprising:
    a discharge circuit including second switch means in series with said first switch means, said second switch means being coupled between said capacitor and said first switch means, said second switch means including control means for turning on said second switch means responsive to the operation of said trigger means to actuate said discharge circuit for discharging any remaining charge from said capacitor to prevent further illumination of said indicator means.

2. The improved electronic flash unit according to claim 1 wherein said second switch means comprises a thyristor.

3. The improved electronic flash unit according to claim 1 further comprising:
    remote indicator means for providing a display similar to said flash unit indicator means at a remote location including a display element and a power source for powering said display element; and
    third switch means for selectively connecting said display element to said power source, said third switch means being connected between said remote indicator means and the indicator means of said flash unit for powering said display element only when said indicator means is energized.

4. The improved electronic flash unit according to claim 3 wherein said third switch means comprises transistor means coupling said power source to said display element and having a base electrode connected to the indicator means of said flash unit.

5. The improved electronic flash unit according to claim 3 wherein said display element is disposed within the viewfinder of a camera which is being operated in conjunction with said flash unit.

6. The improved electronic flash unit according to claim 3 wherein said display element is a light emitting diode.

7. An electronic flash unit characterized by comprising:
    a flash discharge tube;
    first switch means for completing a discharge path through said flash discharge tube when said first switch means is turned on;
    trigger means for turning on said first switch means to operate said electronic flash unit, thus providing a flashlight illumination;
    exposure level control means for receiving the reflected light from a subject during the operation of the flashlight illumination of said flash discharge tube, and turning said first switch means to the off condition when the amount of the flashlight illumination of said flash discharge tube reflected from the subject reaches a predetermined level;
    a capacitor being charged by a current through said flash discharge tube when said first switch means is turned off;
    a series circuit comprised of a display element and a resistor being connected directly across said capacitor, said display element being directly operated by the charge developed across said capacitor; and
    a discharge circuit including said first switch means and a second switch means, said second switch means being coupled between said capacitor and said first switch means, said second switch means having first and second electrodes and a control input, said first electrode being connected in common to said flash discharge tube and said first switch means, said second electrode being connected to said capacitor, and said control input being directly connected to said trigger means and responsive to operation of said trigger means to rapidly discharge said capacitor through said discharge circuit including said first switch means and said second switch means to prevent further illumination of said display element.

8. The electronic flash unit of claim 7, wherein said trigger means further comprises diode means for preventing said first switching means from being turned on when said flash discharge tube is discharged through said capacitor.

9. An electronic flash unit according to claim 7 further comprising third switch means having first and second electrodes and a control input for turning on said third switch means responsive to said exposure level control circuit and a second capacitor coupled between said first switch means and said first electrode of said third switch means, whereby the voltage developed across said second capacitor is applied to said first switch means to turn said first switch means off when said third switch means is turned on.

10. The electronic flash unit of claim 7 further comprising a second capacitor coupled across said display element for causing said display element to operate in a flashing manner when the first-mentioned capacitor is charged to a level sufficient to operate said display element.

11. The electronic flash unit of claim 10 wherein said display element is a neon flash tube.

* * * * *